United States Patent
Hansen et al.

[11] 4,119,621
[45] Oct. 10, 1978

[54] AZO DYES HAVING A BENZOISOTHIAZOLYL DIAZO COMPONENT

[75] Inventors: Guenter Hansen; Hermann Kaack; Norbert Grund, all of Ludwigshafen, Fed. Rep. of Germany

[73] Assignee: BASF Aktiengesellschaft, Ludwigshafen am Rhein, Fed. Rep. of Germany

[21] Appl. No.: 656,390

[22] Filed: Feb. 9, 1976

[30] Foreign Application Priority Data

Feb. 21, 1975 [DE] Fed. Rep. of Germany ....... 2507460

[51] Int. Cl.² .................... C09B 29/08; C09B 29/26; D06P 3/36; D06P 3/54
[52] U.S. Cl. .............................. 260/158; 260/304 R; 260/304 A
[58] Field of Search ........................................ 260/158

[56] References Cited

U.S. PATENT DOCUMENTS

| | | | |
|---|---|---|---|
| 2,349,899 | 5/1944 | Bock | 260/155 |
| 2,373,700 | 4/1945 | McNally et al. | 260/205 |
| 2,891,942 | 6/1959 | Merian | 260/207.1 |
| 3,442,886 | 5/1969 | Dickey et al. | 260/158 |
| 3,455,898 | 7/1969 | Seefelder et al. | 260/158 |
| 3,573,273 | 3/1971 | Seefelder et al. | 260/158 |

FOREIGN PATENT DOCUMENTS

| | | | |
|---|---|---|---|
| 2,028,457 | 12/1970 | Fed. Rep. of Germany | 260/158 |
| 2,222,639 | 11/1972 | Fed. Rep. of Germany | 260/158 |
| 2,251,706 | 4/1974 | Fed. Rep. of Germany | 260/158 |
| 1,223,137 | 2/1971 | United Kingdom | 260/158 |

*Primary Examiner*—Floyd D. Higel
*Attorney, Agent, or Firm*—Keil, Thompson & Shurtleff

[57] ABSTRACT

P-aminoazo dyes of the formula:

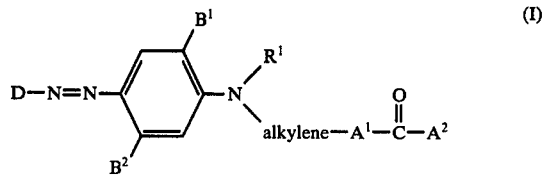

(I)

in which
D is a benzoisothiazolyl group;
$B^1$ is hydrogen, methyl, ethyl, methoxy, ethoxy;
$B^2$ is hydrogen, methyl, ethyl, methoxy, ethoxy, chloro, bromo, $C_1$ to $C_4$ alkanoylamino or $C_1$ to $C_4$ alkoxycarbonylamino;
$R^1$ is the radical

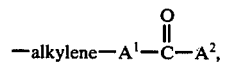

$C_1$ to $C_4$ alkyl optionally bearing hydroxy, $C_1$ to $C_4$ alkoxy, $C_1$ to $C_4$ alkanoyloxy, $C_1$ to $C_4$ alkoxycarbonyl, $C_1$ to $C_4$ alkanoylamino or chloro as a substituent, phenylethyl, phenoxyethyl or cyclohexyl and the group $-A^1-CO-A^2$ represents acyl, acyloxy or acylamino derived from a carbonic acid derivative in which $A^1$ is a single bond, $-O-$, $-NH-$ or

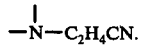

8 Claims, No Drawings

AZO DYES HAVING A BENZOISOTHIAZOLYL DIAZO COMPONENT

The invention relates to dyes of the formula (I):

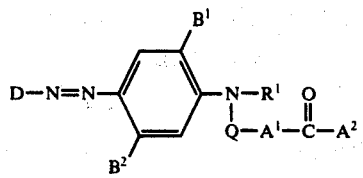

in which
D is a radical of the formula:

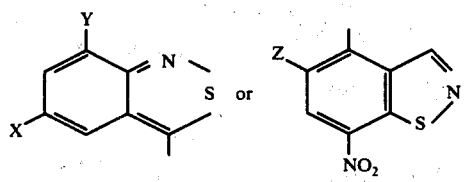

X is nitro, chloro or bromo;
Y is hydrogen, chloro or bromo;
Z is hydrogen, chloro, bromo or cyano;
$B^1$ is hydrogen, methyl, ethyl, methoxy, ethoxy or phenoxy;
$B^2$ is hydrogen, methyl, ethyl, methoxy, ethoxy, chloro, bromo, $C_1$ to $C_4$ alkanoylamino or $C_1$ to $C_4$ alkoxycarbonylamino;
$R^1$ is $C_1$ to $C_4$ alkyl optionally bearing hydroxy, $C_1$ to $C_4$ alkoxy, $C_1$ to $C_4$ alkanoyloxy, $C_1$ to $C_4$ alkoxycarbonyl, $C_1$ to $C_4$ alkanoylamino or chloro as a substituent, cyclohexyl, phenylethyl, phenoxyethyl or a radical of the formula:

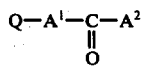

$A^1$ is a direct bond, —O—, —NH— or

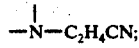

$A^2$ is a radical of the formula

or (when $A^1$ is —NH— or —O—) may also be —O—$A^5$;
$A^3$ is hydrogen, $C_1$ to $C_8$ alkyl optionally bearing hydroxy, $C_1$ to $C_4$ alkoxy, chloro, cyano, $C_1$ to $C_4$ alkoxycarbonyl, $C_1$ to $C_4$ alkanoylamino, $C_1$ to $C_4$ alkylaminocarbonyloxy, $C_1$ to $C_4$ alkoxycarbonyloxy or $C_1$ to $C_4$ alkanoyloxy as a substituent, allyl, cyclohexyl, benzyl, or phenyl optionally bearing chloro, bromo, methyl or $C_1$ to $C_4$ alkoxycarbonyl as a substituent;
$A^4$ is hydrogen or $C_1$ to $C_4$ alkyl optionally bearing hydroxy, chloro, $C_1$ to $C_4$ alkoxy or $C_1$ to $C_4$ alkanoyloxy as a substituent;
$A^5$ is $C_1$ to $C_4$ alkyl optionally bearing hydroxy, chloro, $C_1$ to $C_4$ alkoxy, $C_1$ to $C_4$ alkanoyloxy or $C_1$ to $C_4$ alkylaminocarbonyloxy as a substituent, cyclohexyl or phenyl; and
Q is a radical of the formula

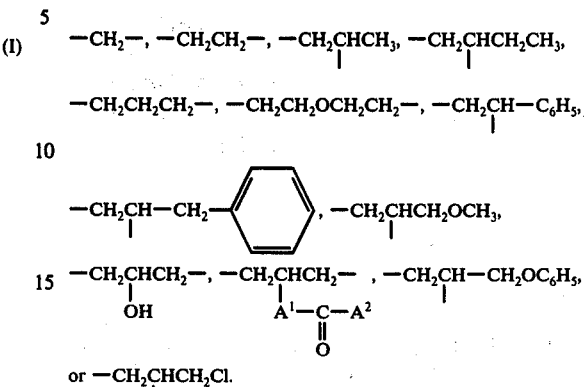

or —CH$_2$CHCH$_2$Cl.

Examples of alkanoylamino radicals $B^2$ are: butyrylamino, propionylamino, formylamino and particularly acetylamino and also NHCOOCH$_3$, NHCOOC$_2$H$_5$, NHCOOC$_3$H$_7$ and NHCOOC$_4$H$_9$.

Examples of radicals $R^1$ other than those already specified are: C$_2$H$_4$OC$_3$H$_7$, C$_2$H$_4$OC$_4$H$_9$, C$_2$H$_4$OCOC$_4$H$_9$, C$_2$H$_4$OCOC$_3$H$_7$, C$_2$H$_4$OCOC$_2$H$_5$,

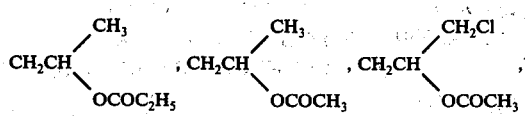

C$_2$H$_4$COOC$_4$H$_9$, C$_3$H$_6$NHCOCH$_3$, C$_2$H$_4$COOC$_3$H$_7$, C$_2$H$_4$Cl, particularly CH$_3$, C$_2$H$_5$, C$_3$H$_7$, C$_4$H$_9$, C$_2$H$_4$OH, C$_2$H$_4$CN, CH$_2$CHOHCH$_3$, C$_2$H$_4$OCH$_3$, C$_2$H$_4$OC$_2$H$_5$, C$_2$H$_4$OCOCH$_3$, C$_2$H$_4$COOCH$_3$ and C$_2$H$_4$COOC$_2$H$_5$.

Examples of radicals Q—$A^1$—CO—$A^2$ are: C$_2$H$_4$CONHCH$_3$, C$_2$H$_4$CON(CH$_3$)$_2$, C$_2$H$_4$CONHC$_2$H$_5$, C$_2$H$_4$CON(C$_2$H$_5$)$_2$,

C$_2$H$_4$CONHC$_3$H$_7$, C$_2$H$_4$CONHC$_4$H$_9$, C$_2$H$_4$CON(C$_4$H$_9$)$_2$,

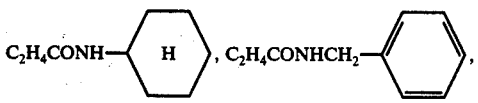

C$_2$H$_4$CONHC$_2$H$_4$CN,

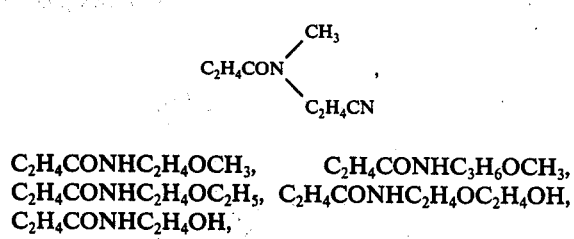

C$_2$H$_4$CONHC$_2$H$_4$OCH$_3$, C$_2$H$_4$CONHC$_3$H$_6$OCH$_3$, C$_2$H$_4$CONHC$_2$H$_4$OC$_2$H$_5$, C$_2$H$_4$CONHC$_2$H$_4$OC$_2$H$_4$OH, C$_2$H$_4$CONHC$_2$H$_4$OH,

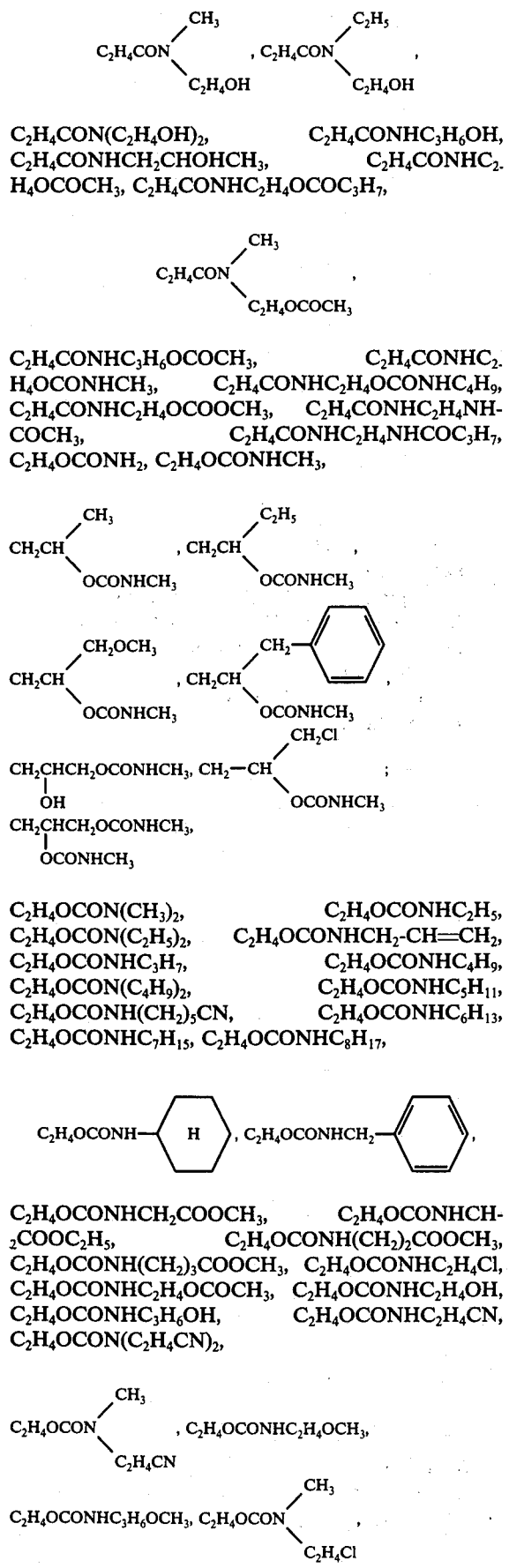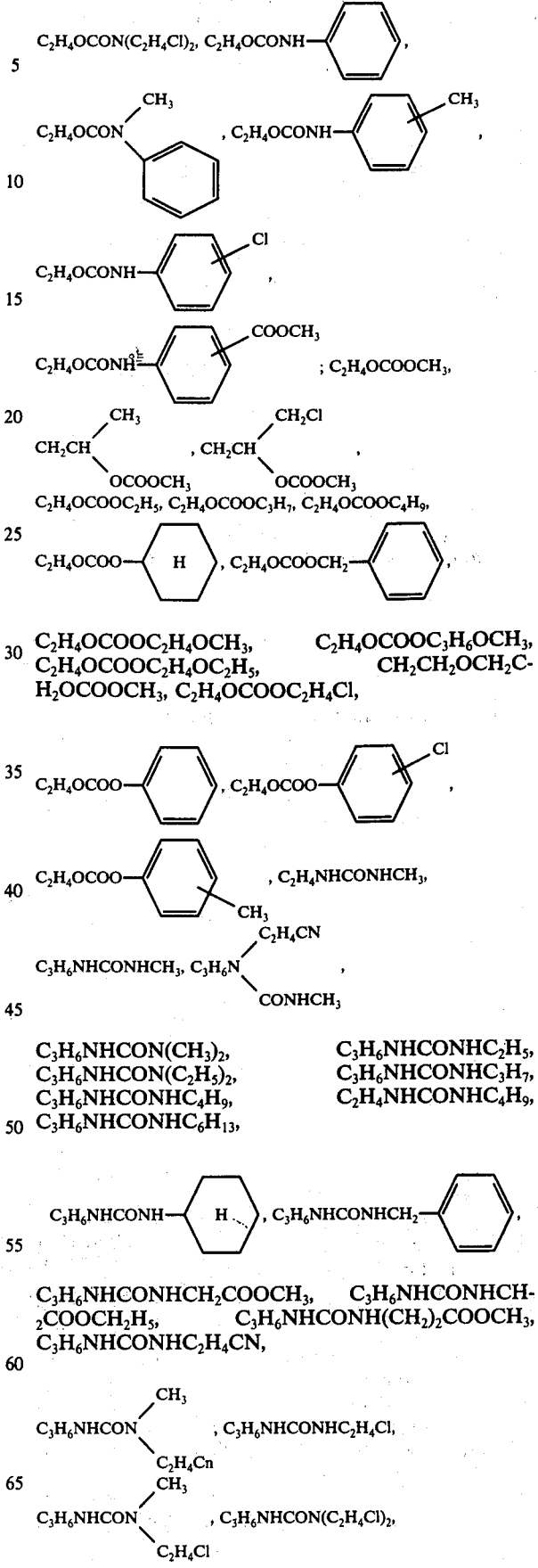

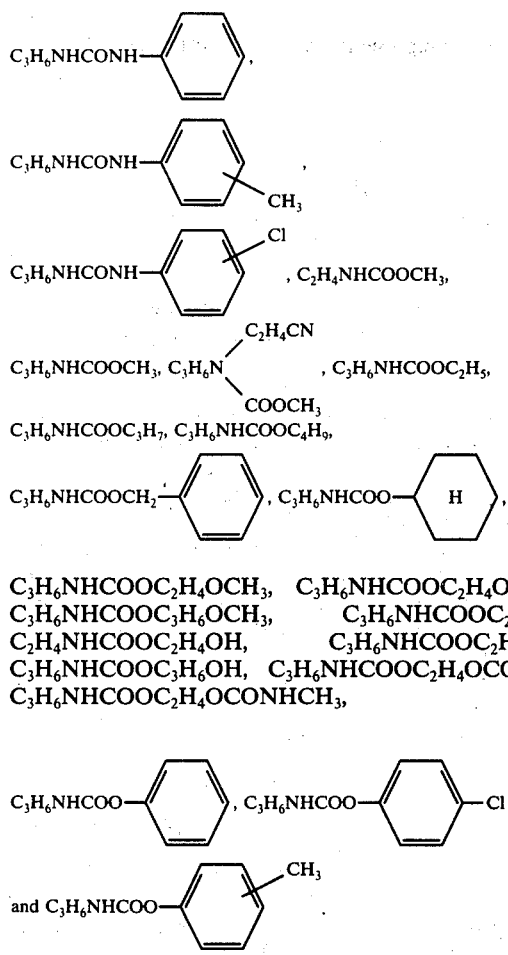

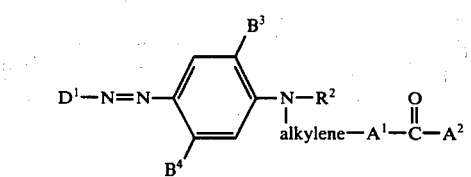

$C_3H_6NHCOOC_2H_4OCH_3$, $C_3H_6NHCOOC_2H_4OC_2H_5$,
$C_3H_6NHCOOC_3H_6OCH_3$, $C_3H_6NHCOOC_2H_4Cl$,
$C_2H_4NHCOOC_2H_4OH$, $C_3H_6NHCOOC_2H_4OH$,
$C_3H_6NHCOOC_3H_6OH$, $C_3H_6NHCOOC_2H_4OCOCH_3$,
$C_3H_6NHCOOC_2H_4OCONHCH_3$,

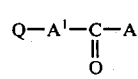

Dyes of the formula (Ia):

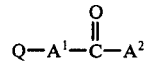

in which
- $D^1$ is 5-nitrobenzoisothiazolyl-(2,1), 5-nitro-7-bromobenzoisothiazolyl-(2,1), 7-nitrobenzoisothiazolyl-(1,2), 5-bromo-7-nitrobenzoisothiazolyl-(1,2) or 5-cyano-7-nitrobenzoisothiazolyl-(1,2);
- $B^3$ is hydrogen, methoxy or ethoxy;
- $B^4$ is hydrogen, chloro, methyl, acetylamino or propionylamino; and
- $R^2$ is $C_1$ to $C_4$ alkyl, $C_1$ to $C_4$ alkoxyethyl, $C_1$ to $C_4$ alkoxypropyl, β-cyanoethyl, β-chloroethyl, β-hydroxyethyl, β-hydroxypropyl, β-$C_1$ to $C_4$ alkanoyloxyethyl, β-$C_1$ to $C_4$ alkanoyloxypropyl, $C_1$ to $C_4$ alkoxycarbonyl, phenylethyl or a radical of the formula $$Q-A^1-\underset{\underset{O}{\|}}{C}-A^2$$

in which $A^1$ and $A^2$ have the above meanings are of particular technical importance.

Examples of preferred radicals $$Q-A^1-\underset{\underset{O}{\|}}{C}-A^2$$

are: $C_2H_4CONHCH_3$, $C_2H_4CONHC_2H_5$, $C_2H_4CONHC_3H_7$, $C_2H_4CONHC_4H_9$, $C_2H_4CONHC_2H_4OCH_3$, $C_2H_4CONHC_3H_6OCH_3$, $C_2H_4CONHC_2H_4OH$,

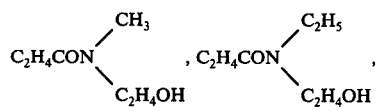

$C_2H_4CONHC_3H_6OH$, $C_2H_4CONHCH_2CHOHCH_3$, $C_2H_4CONHC_2H_4OCOCH_3$, $C_2H_4NHC_2H_4OCOC_3H_7$,

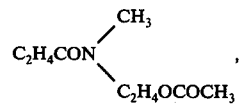

$C_2H_4CONHC_3H_6OCOCH_3$, $C_2H_4CONHC_2H_4OCONHCH_3$, $C_2H_4CONHC_2H_4OCONHC_4H_9$, $C_2H_4OCONHCH_3$,

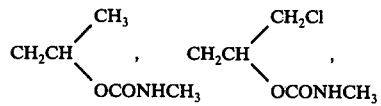

$C_2H_4OCON(CH_3)_2$, $C_2H_4OCON(C_2H_5)_2$,
$C_2H_4OCONHC_3H_7$, $C_2H_4OCONHC_4H_9$,
$C_2H_4OCONHCH_2COOC_2H_5$, $C_2H_4OCONHCH_2COOCH_3$, $C_2H_4OCONHC_2H_4Cl$,

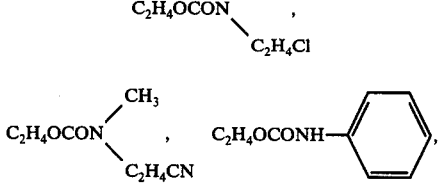

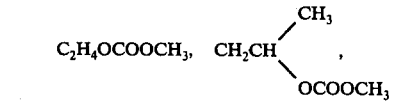

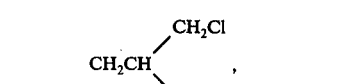

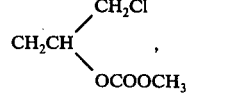

$C_2H_4OCOOC_2H_5$, $C_2H_4OCOOC_3H_7$, $C_2H_4OCOOC_4H_9$,

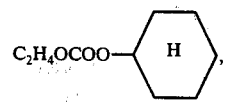

C₂H₄OCOOC₂H₄OCH₃, C₂H₄OCOOC₃H₆OCH₃,
C₂H₄OCOOC₂H₄Cl; C₃H₆NHCONHCH₃,
C₃H₆NHCON(CH₃)₂, C₃H₆NHCON(C₂H₅)₂,
C₃H₆NHCONHC₃H₇, C₃H₆NHCONHC₄H₉,
C₃H₆NHCONHCH₂COOC₂H₅,

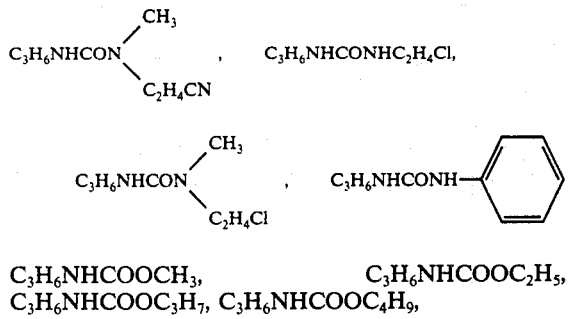

C₃H₆NHCOOCH₃, C₃H₆NHCOOC₂H₅,
C₃H₆NHCOOC₃H₇, C₃H₆NHCOOC₄H₉,

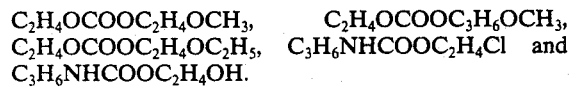

C₂H₄OCOOC₂H₄OCH₃, C₂H₄OCOOC₃H₆OCH₃,
C₂H₄OCOOC₂H₄OC₂H₅, C₃H₆NHCOOC₂H₄Cl and
C₃H₆NHCOOC₂H₄OH.

Particularly preferred meanings are:

D¹: 5-nitrobenzoisothiazolyl-(2,1), 7-nitrobenzoisothiazolyl-(1,2), 5-bromo-7-nitrobenzoisothiazolyl-(1,2) or 5-cyano-7-nitrobenzoisothiazolyl-(1,2);

B³: hydrogen;

B⁴: hydrogen, methyl or acetylamino; and

R²: methyl, ethyl, methoxyethyl, β-cyanoethyl, β-hydroxyethyl, or a radical of the formula $$Q-A^1-\underset{\underset{O}{\|}}{C}-A^2.$$

Particularly preferred radicals $$Q-A^1-\underset{\underset{O}{\|}}{C}-A^2$$

are:

C₂H₄CONHC₂H₄OH,

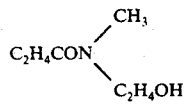

C₂H₄CONHC₃H₆OH, C₂H₄CONHCH₂CHOHCH₃,
C₂H₄CONHC₂H₄OCOCH₃,

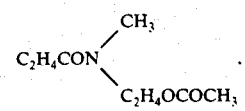

C₂H₄CONHC₃H₆OCOCH₃, C₂H₄OCONHCH₃,
C₂H₄OCON(CH₃)₂, C₂H₄OCONHC₄H₉,
C₃H₆NHCONHCH₃, C₃H₆NHCONHC₄H₉,
C₃H₆NHCOOCH₃ and C₃H₆NHCOOC₂H₄OH.

Dyes of the formula (I) may be prepared by reacting a diazonium compound of an amine of the formula (II):

D—NH₂ (II)

with a coupling component of the formula (III):

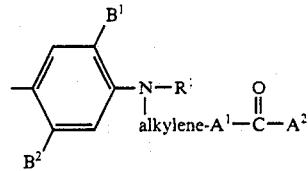

where D, B¹, B², R¹, A¹ and A² have the above meanings, the diazotization and coupling being carried out as usual.

Dyes of the formula (I) are red to greenish blue and are suitable for dyeing synthetic and cellulosic fibers and particularly cellulose esters and polyesters.

Dyeings are obtained which show deep shades and generally have very good wet and light fastness properties and also resistance to high temperatures. In the case of dyes suitable for cellulose esters the very good fastness to gas fume fading, dry cleaning and perspiration may be stressed and in the case of the polyester dyes fastness to thermofixation and fastness properties after thermofixation.

The following Examples illustrate the invention. In them the references to parts and percentages are by weight unless otherwise stated.

EXAMPLE 1

19.5 parts of 3-amino-5-nitro-2,1-benzoisothiazole is introduced into 100 parts of 85% sulfuric acid at from 10° to 15° C. 30 parts of nitrosylsulfuric acid (with a content of 13.1% of dinitrogen trioxide) is dripped into this solution at 0° to 5° C. The diazo solution obtained is stirred for another three hours at 0° to 5° C. and then dripped into a solution of 25 parts of N-ethyl-N-β-[N'-methyl-N'-(β-hydroxyethyl)]-carbamoyl-ethylaniline, 40 parts of 10% hydrochloric acid, 500 parts of water, 500 parts of ice and 1 part of sulfamic acid. The whole is then neutralized to pH 1.5 with sodium acetate solution, and the precipitated dye is suction filtered, washed with water until neutral and dried at subatmospheric pressure at 50° C. 31 parts of the dye of the formula:

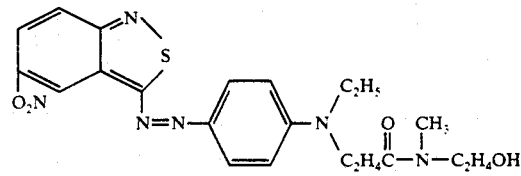

is obtained; it gives on polyesters and preferentially on cellulose esters intense blue dyeings with good fastness properties and particularly good fastness to light, wet treatment and dry cleaning.

EXAMPLE 2

9.7 Parts of 4-amino-7-nitro-1,2-benzoisothiazole is introduced at 10° to 15° C. into 100 parts of 85% sulfuric acid. 15 parts of nitrosylsulfuric acid (with a content of 13.1% of dinitrogen trioxide) is dripped into this solution at from 0° to 5° C. The diazo solution obtained is stirred for another three hours at 0° to 5° C. and then dripped into a solution of 13.9 parts of N-ethyl-N-β-(N'-

β-acetoxyethyl)-carbamoylethyl-aniline, 20 parts of 10% hydrochloric acid, 250 parts of water, 250 parts of ice and 1 part of sulfamic acid. Neutralization to pH 1.5 is then carried out with sodium acetate solution, the precipitated dye is suction filtered, washed with water until neutral and dried at subatmospheric pressure at 50° C. 31 parts of the dye of the formula:

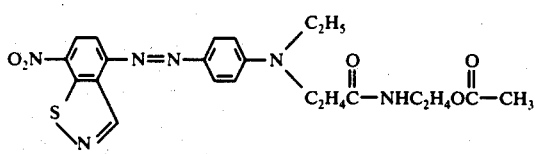

is obtained which gives intense violet dyeings having good fastness properties on polyesters and cellulose esters.

EXAMPLE 3

19.5 Parts of 3-amino-5-nitro-2,1-benzoisothiazole is introduced at from 10° to 15° C. into 100 parts of 85% sulfuric acid. 30 parts of nitrosylsulfuric acid (having a content of 13.1% of dinitrogen trioxide) is dripped into this solution at 0° to 5° C. The diazo solution obtained is stirred for another three hours at from 0° to 5° C. and then dripped into a solution of 22.2 parts of N-ethyl-N-[β-(methylaminocarbonyloxy)-ethyl]-aniline, 40 parts of 10% hydrochloric acid, 500 parts of water, 500 parts of ice and 1 part of sulfamic acid. The whole is then neutralized to pH 1 with sodium acetate solution. The precipitated dye is suction filtered, washed with water until it is neutral and dried at subatmospheric pressure at 50° C. 32 parts of the dye of the formula:

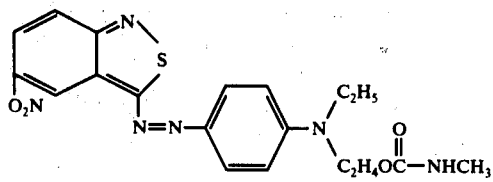

is obtained. It gives intense blue dyeings with good fastness properties on polyesters and cellulose esters.

EXAMPLE 4

19.5 Parts of 3-amino-5-nitro-2,1-benzoisothiazole is introduced at from 10° to 15° C. into 100 parts of 85% sulfuric acid. 30 parts of nitrosylsulfuric acid (13.1% of $N_2O_3$) is dripped into this solution at from 0° to 5° C. The diazo solution obtained is stirred for 3 hours at from 0° to 5° C. and then dripped into a solution of 26.4 parts of N-ethyl-N-[β-(n-butylaminocarbonyloxy)-ethyl]-aniline, 40 parts of 10% hydrochloric acid, 500 parts of water, 500 parts of ice and 1 part of sulfamic acid. The whole is then neutralized to pH 1.5 with sodium acetate. The precipitated dye is suction filtered, washed with water until it is neutral and dried at 50° C. at subatmospheric pressure. 33 parts of the dye of the formula

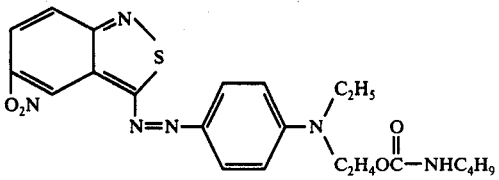

is obtained which gives intense blue dyeings with good fastness properties on polyesters.

EXAMPLE 5

13.7 Parts of 4-amino-5-bromo-7-nitro-1,2-benzoisothiazole is dissolved in 100 parts of 96% sulfuric acid at from 10° to 15° C. Then 30 parts of a mixture (17:3) of glacial acetic acid and propionic acid is gradually added to the solution at from 0° to 5° C. and diazotization is effected by dripping in 15 parts of nitrosylsulfuric acid (13.1% of $N_2O_3$) at 0° to 5° C. The whole is stirred for another three hours at 0° to 5° C. and the diazo solution is run into a solution of 13.2 parts of N-ethyl-N-[β-(n-butylcarbamoyloxy)ethyl]-aniline, 20 parts of 10% hydrochloric acid, 250 parts of water, 200 parts of ice and 1 part of sulfamic acid. The pH is adjusted to 1.5 with sodium acetate solution, and the precipitated dye is suction filtered, washed with water until it is neutral and dried at subatmospheric pressure at 50° C. 22 parts of the dye of the formula:

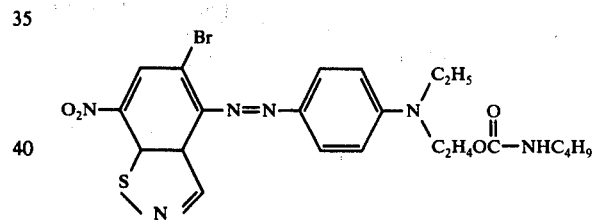

is obtained. It gives an intense reddish blue having good fastness properties on polyesters.

EXAMPLE 6

5.5 Parts of 4-amino-5-cyano-7-nitrobenzoisothiazole-(1,2) is introduced at 10° C. into a mixture of acids consisting of 50 parts of 85% sulfuric acid and 15 parts of a mixture (17:3) of glacial acetic acid and propionic acid. 9.5 parts of nitrosylsulfuric acid (11.1% $N_2O_3$) is added at from 0° to 5° C. and the mixture is stirred for four hours at this temperature. Excess nitrosylsulfuric acid is destroyed in the usual way. The diazo solution is added in portions to a solution, cooled to from 0° to 5° C., of 9.6 parts of N-ethyl-N-[-β-(n-butylamino-carbonyloxy)-ethoxy]-m-toluidine in 100 parts by volume of glacial acetic acid and at the same time 250 parts of ice is introduced gradually. After the coupling is completed the dye is suction filtered, washed with water until it is neutral and dried at 50° C. at subatmospheric pressure.

10.4 parts of the dye of the formula:

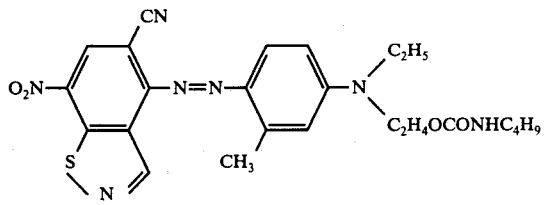

is obtained. It gives very intense dyeings having outstanding fastness properties on polyesters.

EXAMPLE 7

19.5 Parts of 3-amino-5-nitro-2,1-benzoisothiazole is introduced at from 10° to 15° C. into 100 parts of 85% sulfuric acid. 30 parts of nitrosylsulfuric acid (having a content of 13.1% of dinitrogen trioxide) is dripped in at from 0° to 5° C. The diazo solution obtained is stirred at from 0° to 5° C. for three hours and then dripped into a solution of 26.6 parts of N-ethyl-N-(carbo-β-oxyethoxyaminopropyl)-aniline, 40 parts of 10% hydrochloric acid, 500 parts of water, 500 parts of ice and 1 part of sulfamic acid. Then the pH is adjusted to 1 with sodium acetate solution. The precipitated dye is suction filtered, washed with water until it is neutral and dried at 50° C. at subatmospheric pressure. 33 parts of the dye of the formula:

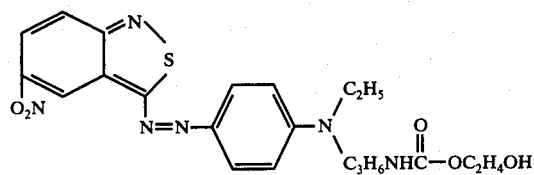

is obtained. It gives intense blue dyeings having good fastness properties on polyesters and cellulose esters.

EXAMPLE 8

9.7 Parts of 4-amino-7-nitrobenzoisothiazole-(1,2) is introduced into 100 parts of 85% sulfuric acid at from 10° to 15° C. 15 parts of nitrosylsulfuric acid (with a content of 13.1% of dinitrogen trioxide) is dripped into this solution at from 0° to 5° C. The diazo solution obtained is stirred for another 3 hours at 0° to 5° C. and then dripped into a solution of 14.0 parts of N-ethyl-N-(carbo-β-oxyethoxy-aminopropyl)-m-toluidine, 40 parts of 10% hydrochloric acid, 500 parts of water, 500 parts of ice and 1 part of sulfamic acid. The pH is then adjusted to 1 with sodium acetate solution. The precipitated dye is suction filtered, washed with water until it is neutral and dried at 50° C. at subatmospheric pressure. 34 parts of the dye of the formula:

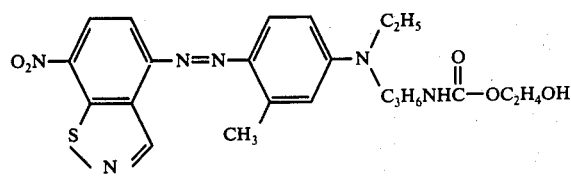

is obtained. It gives intense violet dyeings on polyesters and cellulose esters.

EXAMPLE 9

5.5 Parts of 4-amino-5-cyano-7-nitrobenzoisothiazole-(1,2) is introduced at 10° C. into a mixture of acids consisting of 50 parts of 85% sulfuric acid and 15 parts by volume of a mixture (17:3) of glacial acetic acid and propionic acid. 9.5 parts of nitrosylsulfuric acid (11.1% of $N_2O_3$) is added at from 0° to 5° C. and the mixture is stirred for four hours at this temperature. The excess of nitrosylsulfuric acid is destroyed as usual. The diazo solution is added in portions to a solution, cooled to 0° to 5° C., of 5.5 parts of N-ethyl-N-[γ-(methoxycarbonylamino)-propyl-]aniline in 100 parts by volume of glacial acetic acid and 250 parts of ice is gradually added at the same time. When the coupling has been completed the dye is suction filtered, washed with water until it is neutral and dried at 50° C. at subatmospheric pressure. 8.7 parts of the dye of the formula:

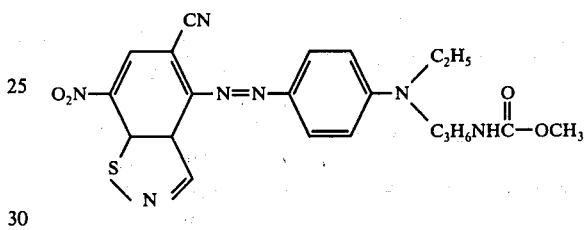

is obtained. It dyes polyesters full blue hues having good fastness properties.

EXAMPLE 10

5.5 parts of 4-amino-5-cyano-7-nitrobenzoisothiazole is introduced at 10° C. into a mixture of acids consisting of 50 parts 85% sulfuric acid and 15 parts by volume of a mixture (17:3) of glacial acetic acid and propionic acid. 9.5 parts of nitrosylsulfuric acid (M = 342) is added thereto at from 0° to 5° C. and the mixture is stirred for 4 hours at this temperature. The excess of nitrosylsulfuric acid is destroyed in the usual way. The diazo solution is added in portions to a solution, cooled to 0° to 5° C., of 6.9 parts of N-ethyl-N-[γ-(n-butylaminocarbonylamino)-propyl]-aniline in 100 parts by volume of glacial acetic acid and at the same time 250 parts of ice is gradually introduced. After the coupling is ended the dye is suction filtered, washed with water to make it neutral and dried at 50° C. at subatmospheric pressure 9.8 parts of the dye of the formula:

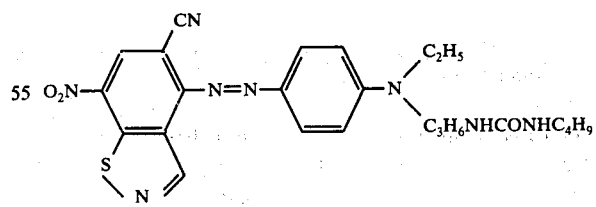

is obtained. It gives intense blue dyeings having good fastness properties on polyesters.

Dyes of the formula (I) which are hereinafter characterized by specifying their substituents are also obtained by methods analogous to those described in Examples 1 to 10.

| No. | DK | B¹ | B² | R¹ | alkylene | A¹ | A² | Hue |
|---|---|---|---|---|---|---|---|---|
| 11 | ![structure: N=S ring with O₂N substituent] | H | H | C₂H₄OH | C₂H₄ | — | NHCH₃ | blue |
| 12 | " | H | H | C₂H₅ | C₂H₄ | — | NHC₂H₄OH | " |
| 13 | " | H | H | CH₂CHOHCH₂Cl | C₂H₄ | — | NHC₂H₄OH | " |
| 14 | " | H | H | C₂H₅ | C₂H₄ | — | NHC₃H₆OH | " |
| 15 | " | H | H | C₂H₅ | C₂H₄ | — | NHCH₃ | " |
| 16 | " | H | H | C₂H₅ | C₂H₄ | — | NHC₂H₄OC₂H₄OH | " |
| 17 | " | H | H | C₂H₅ | C₂H₄ | — | N(C₂H₅)(C₂H₄OH) | " |
| 18 | " | H | H | C₂H₅ | C₂H₄ | — | NHC₂H₄OCOCH₃ | " |
| 19 | " | H | H | CH₃ | C₂H₄ | — | NHC₂H₄NHCOCH₃ | " |
| 20 | " | H | CH₃ | C₂H₅ | C₂H₄ | O | NHCH₃ | " |
| 21 | " | H | CH₃ | C₂H₄OCH₃ | C₂H₄ | O | NHCH₃ | " |
| 22 | " | H | NHCOCH₃ | C₂H₄OCONHCH₃ | C₂H₄ | O | NHCH₃ | greenish blue |
| 23 | " | H | CH₃ | C₂H₄COOCH₃ | C₂H₄ | O | NHCH₃ | blue |
| 24 | " | H | H | C₂H₄OCONHCH₃ | C₂H₄ | O | NHCH₃ | " |
| 25 | " | H | H | C₂H₅ | CH₂CHCH₂Cl | O | NHCH₃ | " |
| 26 | " | H | H | C₂H₅ | CH₂CHC₂H₅ | O | NHCH₃ | " |
| 27 | " | H | H | C₂H₅ | C₂H₄ | O | NHCH₃ | " |
| 28 | " | H | H | C₂H₅ | C₂H₄ | O | N(CH₃)₂ | " |
| 29 | " | H | H | C₂H₅ | C₂H₄ | O | NHCH₂COOC₂H₅ | " |
| 30 | " | H | H | C₂H₄OCOCH₃ | C₂H₄ | O | NHC₂H₄Cl | " |
| 31 | " | H | H | C₂H₅ | C₂H₄ | O | NHC₂H₄OH | " |
| 32 | " | H | H | C₂H₅ | C₂H₄ | O | NHCH₃ | " |
| 33 | " | H | CH₃ | C₂H₅ | C₂H₄ | O | N(CH₃)₂ | " |
| 34 | " | H | CH₃ | CH₃ | C₂H₄ | O | NHC₂H₉ | " |
| 35 | " | OCH₃ | NHCOCH₃ | C₂H₄CN | C₂H₄ | O | NHC₂H₉ | " |
| 36 | " | H | CH₃ | C₂H₅ | C₂H₄ | O | NH(CH₂)₃CN | " |
| 37 | " | H | H | C₂H₅ | C₂H₄ | O | OCH₃ | " |
| 38 | " | H | H | C₂H₄OCOOCH₃ | C₂H₄ | O | OC₂H₅ | " |
| 39 | " | H | H | C₂H₄OCOOCH₃ | C₂H₄ | O | OC₂H₄Cl | " |
| 40 | " | H | H | C₂H₅ | C₂H₄ | O | OC₄H₉ | " |
| 41 | " | H | H | C₂H₅ | C₂H₄ | NH | NHC₂H₉ | " |
| 42 | " | H | H | C₂H₅ | C₃H₆ | NC₂H₄CN | NHC₂H₉ | " |
| 43 | " | H | H | C₂H₅ | C₃H₆ | NH | N(CH₃)₂ | greenish blue |
| 44 | " | H | H | C₂H₅ | C₃H₆ | NH | NH-C₆H₁₁(H) | blue |
| 45 | " | H | H | C₂H₅ | C₃H₆ | NH | OCH₃ | bluish violet |
| 46 | " | H | H | CH₃ | C₃H₆ | NH | OCH₃ | " |

-continued

| No. | DK | B¹ | B² | R¹ | alkylene | A¹ | A² | Hue |
|---|---|---|---|---|---|---|---|---|
| 47 | " | H | CH₃ | C₂H₅ | C₃H₆ | NH | OC₂H₄OH | " |
| 48 | " | H | H | C₂H₅ | C₃H₆ | NH | OC₂H₄OH | " |
| 49 | " | H | H | C₂H₅ | C₃H₆ | NH | OC₂H₄OCOCH₃ | " |
| 50 | " | H | H | C₂H₅ | C₃H₆ | NH | OC₂H₄OCOCH₃ | " |
| 51 | 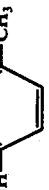 | H | H | C₂H₅ | C₂H₄ | — |  | greenish blue |
| 52 | " | H | H | C₄H₉ | C₂H₄ | — | NHC₂H₄OCONHCH₃ | " |
| 53 | " | H | H | C₂H₅ | C₂H₄ | — | NHC₂H₄OCH₃ | " |
| 54 | " | H | H | C₂H₅ | CH₂CHCH₃ | O | NHCH₃ | " |
| 55 | " | H | H | C₂H₅ | C₂H₄ | O | NHC₂H₉ | " |
| 56 | " | H | H | C₂H₅ | C₂H₄ | O | NH(C₂H₉)₂ | " |
| 57 | " | H | H | C₂H₅ | C₂H₄ | O | NHCH₂COOC₂H₅ | " |
| 58 | " | H | H | C₂H₅ | C₂H₄ | O | NHCH₂—CH=CH₂ | " |
| 59 | " | H | H | C₂H₅ | C₂H₄ | O |  | " |
| 60 | " | H | H | C₂H₄—C₆H₅ | C₂H₄ | O | OCH₃ | " |
| 61 | " | H | H | C₂H₅ | C₂H₄ | O | OCH₃ | " |
| 62 | " | H | H | C₃H₆ | C₃H₆ | NH | NHC₄H₉ | " |
| 63 | " | H | H | C₂H₅ | C₃H₆ | NH | 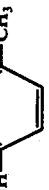 | " |
| 64 | " | H | H | C₃H₆ | C₃H₆ | NH | NHCH₃ | " |
| 65 | " | H | H | C₂H₅ | C₃H₆ | NH | OC₂H₄OH | " |
| 66 | " | H | CH₃ | CH₃ | C₃H₆ | NH | OC₂H₄OH | " |
| 67 | " | H | H | C₂H₅ | C₃H₆ | NH | OC₂H₄OCONHC₄H₉ | " |
| 68 | " | H | CH₃ | C₂H₅ | C₃H₆ | NH | 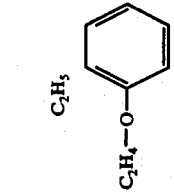 | " |

-continued

| No. | DK | B¹ | B² | R¹ | alkylene | A¹ | A² | Hue |
|---|---|---|---|---|---|---|---|---|
| 69 | [2-methyl-3H-benzothiazole with Cl and NO₂ substituents] | H | H | C₂H₅ | C₂H₄ | — | N(CH₃)(C₂H₄OCOCH₃) | " |
| 70 | " | H | CH₃ | C₂H₅ | C₂H₄ | O | NHC₄H₉ | " |
| 71 | " | H | H | C₂H₅ | C₃H₆ | NH | OC₂H₄OH | " |
| 72 | " | H | H | C₂H₄OH | C₂H₄ | — | NHC₂H₄NHCOC₃H₇ | violet |
| 73 | [benzothiazole with Br] | H | H | C₂H₅ | C₂H₄ | O | NHC₄H₉ | " |
| 74 | " | H | H | C₂H₅ | CH₂CHCH₂Cl | O | NHCH₂-C₆H₅ | " |
| 75 | [benzothiazole with 2Cl] | H | H | C₂H₄Cl | C₂H₄ | — | NHC₃H₇(n) | " |
| 76 | " | H | H | C₂H₅ | C₂H₄ | O | NHC₃H₁₁(cyclohexyl) | " |
| 77 | " | H | H | C₂H₅ | C₃H₆ | O | NHC₃H₁₁(cyclohexyl-O) | " |
| 78 | [benzisothiazole with NO₂ and CH₃] | H | H | C₂H₅ | C₂H₄ | NH | NHC₂H₄Cl | " |
| 79 | " | H | H | C₂H₄OCOC₃H₇ | | — | NHC₄H₉ | " |
| 80 | " | H | H | C₂H₅ | C₂H₄ | — | NHC₂H₄OH | " |
| 81 | " | H | H | C₂H₅ | C₂H₄ | — | NHC₂H₆OCOCH₃ | " |
| 82 | " | H | H | C₂H₅ | CH₂ | — | N(CH₃)(C₂H₄OCOC₃H₇) | " |
| 83 | " | H | H | C₂H₅ | C₂H₄ | — | NHC₂H₄OCOC₃H₇ | " |

-continued

| No. | DK | B¹ | B² | R¹ | alkylene | A¹ | A² | Hue |
|---|---|---|---|---|---|---|---|---|
| 84 | " | H | H | C₂H₅ | CH₂CHCH₂Cl | O | NHCH₃ | bluish violet |
| 85 | " | H | HNCOCH₃ | C₂H₄OCONHCH₃ | C₂H₄ | O | NHCH₃ | " |
| 86 | " | H | H | C₂H₄COOC₄H₉ | C₂H₄ | O | NHCH₃ | violet |
| 87 | " | H | Cl | C₂H₄CN | C₂H₄ | O | NHCH₃ | reddish violet |
| 88 | " | OC₂H₅ | H | C₂H₄OCONHCH₃ | C₂H₄ | O | NHCH₃ | " |
| 89 | " | H | NHCOCH₃ | C₂H₄OCONHCH₃ | C₂H₄ | O | NHCH₃ | bluish violet |
| 90 | " | H | H | C₂H₅ | C₂H₄ | O | N(CH₃)₂ | violet |
| 91 | " | H | H | C₂H₄OCONH— | C₂H₄ | O | NH— | |
| 92 | " | H | H | C₂H₅ | C₂H₄ | O | OC₄H₉ | " |
| 93 | " | H | NHCOCH₃ | C₂H₄OCOOC₂H₅ | C₂H₄ | O | OC₂H₅ | " |
| 94 | " | H | H | C₂H₅ | C₂H₄ | O | O— | bluish violet |
| 95 | " | H | CH₃ | C₂H₅ | C₂H₆ | NH | NHCH₃ | " |
| 96 | " | H | CH₃ | C₃H₆NHCOCH₃ | C₂H₆ | NH | NHCH₃ | " |
| 97 | " | H | H | C₂H₅ | C₂H₆ | NH | N(C₂H₉)₂ | " |
| 98 | " | H | H | C₂H₅ | C₃H₆ | NH | OCH₃ | " |
| 99 | " | H | H | C₂H₅ | C₂H₄ | NH | OC₂H₄OH | " |
| 100 | " | H | H | C₂H₅ | C₂H₄ | NH | OC₂H₄OCONHCH₃ | " |
| 101 | " | H | H | C₃H₇ | C₂H₄ | — | NHC₂H₄OCOCH₃ | bluish violet |
| 102 | " | H | H | C₂H₅ | C₂H₄ | O | NH₂ | " |
| 103 | " | H | NHCOCH₃ | C₂H₄OCONHC₄H₉ | C₂H₄ | O | NHC₂H₉ | blue |
| 104 | " | H | C₂H₅ | CH₃ | C₂H₄ | O | | bluish violet |
| 105 | " | H | H | C₂H₅ | CH₂CHCH₂Cl | O | OCH₃ | " |
| 106 | " | H | H | C₂H₅ | C₃H₆ | NH | NHC₄H₉ | " |
| 107 | " | H | H | C₄H₉ | C₃H₆ | NH | O— | " |

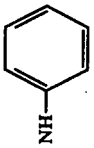
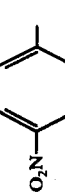

-continued

| No. | DK | B¹ | B² | R¹ | alkylene | A¹ | A² | Hue |
|---|---|---|---|---|---|---|---|---|
| 108 | [4-Br, 3-CH₃, 6-NO₂ benzisothiazole] | H | H | C₂H₄OCOC₃H₇ | C₂H₄ | — | N(CH₃)₂ | " |
| 109 | " | H | H |  | C₂H₄ | — | NHC₂H₅ | " |
|  |  |  |  | CH₂CH(CH₂Cl)OCOCH₃ |  |  |  |  |
| 110 | " | H | H | C₂H₅ | C₂H₄ | — | NHC₂H₆OCOCH₃ | " |
| 111 | " | H | H | C₂H₅ | C₂H₄ | — | NHC₂H₆OCOC₃H₇ | " |
| 112 | " | H | H | C₂H₄OCONHCH₃ | C₂H₄ | — | NHC₂H₄OCONHCH₃ | " |
| 113 | " | H | H | C₂H₅ | C₂H₄ | — | NHC₂H₄OOCCH₃ | " |
| 114 | " | H | CH₃ | C₂H₅ | C₂H₄ | O | NHCH₃ | " |
| 115 | " | H | H | CH₃ | CHCHCH₃ | O | NHCH₃ | " |
|  |  |  |  | CH₂CH(CH₂Cl)OCOCH₃ |  |  |  |  |
| 116 | [dihydro analog] | CH₃ | H | C₂H₄OCONHCH₃ | C₂H₄ | O | NHCH₃ | " |
| 117 | " | H | H | C₂H₅ | CH₂CHCH₂OCONHCH₂ | O | NHCH₃ | " |
| 118 | " | H | NHCHO | C₂H₄OCONHC₄H₉ | C₂H₄ | O | NHC₄H₉ | blue |
| 119 | " | H | H | C₂H₅ | C₂H₄ | O | NHC₆H₁₃ | bluish violet |
| 120 | " | H | H | C₂H₅ | CH₂CHCH₃ | O | OCH₃ | " |
| 121 | " | [phenyl] | NHCOCH₃ | C₂H₄CN | C₂H₄ | O | OCH₃ | blue |
| 122 | " | H | H | CH₂CHOHCH₃ | CH₂CHCH₃ | O | OC₂H₄Cl | bluish violet |
| 123 | " | H | CH₃ | C₂H₅ | C₂H₆ | O | OC₂H₄OCH₃ | " |
| 124 | " | H | CH₃ | C₂H₅ | C₃H₆ | NH | NHC₄H₉ | blue |
| 125 | " | H | H | C₂H₅ | C₃H₆ | NC₂H₄CN | NHCH₃ | " |
| 126 | " | H | CH₃ | C₃H₆NHCONHCH₃ | C₃H₆ | NH | NHCH₃ | " |

-continued

| No. | DK | B¹ | B² | R¹ | alkylene | A¹ | A² | Hue |
|---|---|---|---|---|---|---|---|---|
| 127 | 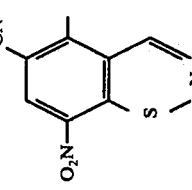 | H | H | C₂H₄OCH₃ | C₃H₆ | NH | N(CH₃)(C₂H₄CN) | " |
| 128 | " | H | CH₃ | C₂H₅ | C₃H₆ | NH | OC₂H₄OH | " |
| 129 | " | H | H | C₂H₅ | C₃H₆ | NH | OC₂H₄OCOCH₃ | " |
| 130 | " | H | CH₃ | C₂H₅ | C₃H₆ | NH | OC₂H₅ | " |
| 131 | " | H | CH₃ | C₂H₅ | C₃H₆ | NH | OC₂H₄Cl | " |
| 132 | " | H | H | C₂H₅ | C₃H₆ | NH | OCH₃ | " |
| 133 | " | H | H | C₂H₄OCONHCH₃ | C₂H₄ | — | NHC₂H₅ | " |
| 134 | " | H | CH₃ | C₂H₅ | C₂H₄ | — | NHC₂H₄OCOCH₃ | " |
| 135 | " | H | CH₃ | C₂H₅ | C₂H₄ | — | NHC₂H₄OCOC₂H₇ | " |
| 136 | " | H | CH₃ | C₂H₅ | C₂H₄ | — | NHC₂H₄NHCOC₂H₇ | " |
| 137 | " | H | CH₃ | C₂H₅ | C₂H₄ | — | N(CH₃)(C₂H₄CN) | " |
| 138 | " | H | CH₃ | C₂H₅ | C₂H₄ | O | NHCH₃ | " |
| 139 | " | H | NHCOC₃H₇ | C₂H₄OCONHCH₃ | CH₂CHCH₂—C₆H₅ | O | NHCH₃ | greenish blue |
| 140 | " | H | H | C₂H₅ | C₂H₄ | O | NHCH₃ | blue |
| 141 | " | C₂H₅ | H | C₂H₄OH | C₂H₄ | O | NHCH₃ | " |
| 142 | " | H | CH₃ | C₂H₅ | CH₂CHCH₂—OCOCH₃ | O | NHCH₃ | " |
| 143 | " | H | CH₃ | C₂H₅ | C₂H₄ | O | NHC₃H₇(i) | " |
| 144 | " | H | CH₃ | C₂H₅ | C₂H₄ | O | NHC₂H₄CN | " |
| 145 | " | H | CH₃ | C₂H₅ | C₂H₄ | O | N(C₂H₄Cl)₂ | " |
| 146 | " | H | CH₃ | CH₂CHOHCH₃ | CH₂CHCH₃ | O | NHC₄H₉ | " |
| 147 | " | H | H | C₃H₇ | C₂H₄ | O | NHC₄H₉ | " |
| 148 | " | H | CH₃ | C₆H₄—C₂H₄ | C₂H₄ | O | NHC₄H₉ | " |

-continued

| No. | DK | B¹ | B² | R¹ | alkylene | A¹ | A² | Hue |
|-----|----|----|----|----|----------|----|----|-----|
| 149 | " | H | H | C₂H₅ | C₂H₄ | O | —NH—(4-Cl-C₆H₄) | " |
| 150 | " | H | CH₃ | C₂H₅ | C₂H₄ | O | OCH₃ | " |
| 151 | " | H | H | (cyclohexyl) | C₂H₄ | O | OC₃H₇ | " |
| 152 | " | H | CH₃ | C₂H₅ | C₂H₄ | O | OC₂H₄OCH₃ | greenish blue |
| 153 | " | H | CH₃ | C₂H₅ | C₃H₆ | NH | NHCH₃ | " |
| 154 | " | H | H | C₂H₅ | C₃H₆ | NH | NHC₄H₉ | " |
| 155 | " | H | CH₃ | C₂H₅ | C₃H₆ | NH | NHC₄H₉ | blue |
| 156 | " | H | CH₃ | C₂H₅ | C₃H₆ | NH | NHC₄H₉ | greenish blue |
| 157 | " | H | CH₃ | C₂H₅ | C₂H₄ | NH | NHCH₂—C₆H₅ | " |
| 158 | " | H | CH₃ | C₂H₅ | C₃H₆ | NH | NHC₆H₁₃ | " |
| 159 | " | H | CH₃ | C₂H₅ | C₃H₆ | NH | OCH₃ | " |
| 160 | " | H | CH₃ | C₂H₅ | C₃H₆ | NH | OC₂H₅ | " |
| 161 | " | H | CH₃ | C₂H₅ | C₂H₄ | NH | O—(cyclohexyl) | " |
| 162 | " | H | CH₃ | C₂H₅ | C₃H₆ | NH | OC₂H₄OH | " |
| 163 | " | H | H | C₂H₅ | C₂H₄ | O | OC₂H₄OCH₃ / NHC₂H₅ | blue |
| 164 | 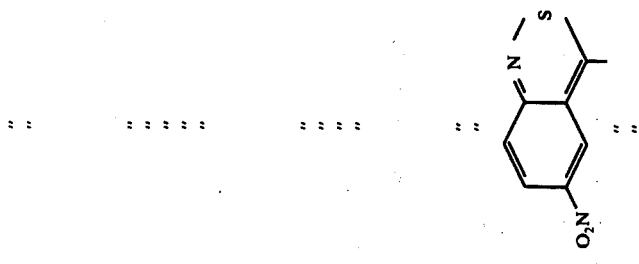 | H | H | C₂H₄CN | C₂H₄ | O | NHC₂H₉/CH₃ | " |
| 165 | " | | CH₃ | C₂H₅ | C₂H₄ | — | —N(C₂H₄OH)₂ | " |
| 166 | " | H | CH₃ | C₂H₅ | C₂H₄ | — | NHC₂H₄OH | " |

We claim:
1. A dye having the formula

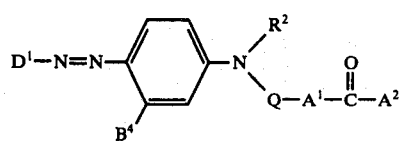

in which:
D¹ is 5-nitrobenzoisothiazolyl-(2,1), or 5-cyano-7-nitrobenzoisothiazolyl-(1,2);
B⁴ is hydrogen or methyl;
R² is $C_1$ to $C_4$ alkyl, $C_1$ to $C_4$ alkoxyethyl, β-cyanoethyl or β-hydroxyethyl;
A¹ is a direct bond, —NH— or —O—;
A² is NH—($C_1$ to $C_4$)-alkyl, NH—$C_2H_4$OH, NH—$C_3H_6$OH, or

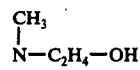

or, when A¹ is —NH— or —O—, is OCH₃, OC₂H₅ or OC₂H₄OH; and
Q is —C₂H₄—, —C₃H₆— or —C₄H₈—.

2. The dye having the formula:

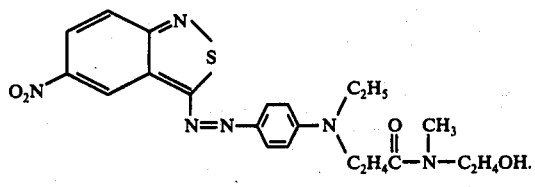

3. The dye having the formula:

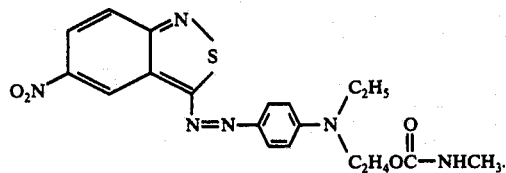

4. The dye having the formula:

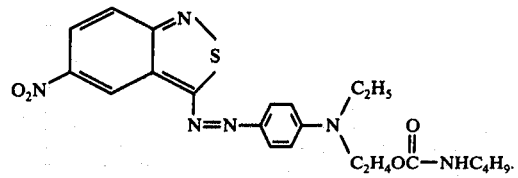

5. The dye having the formula:

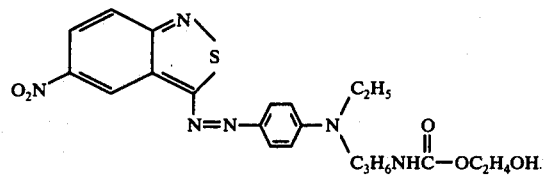

6. The dye having the formula:

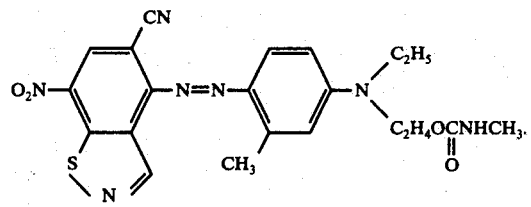

7. The dye having the formula:

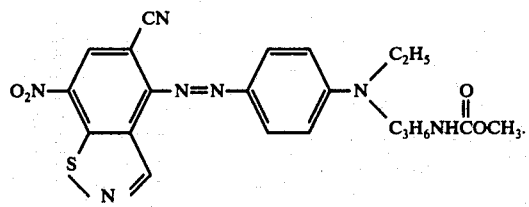

8. The dye having the formula:

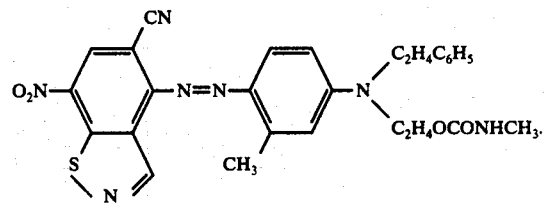

* * * * *